June 27, 1944.  W. R. LUKENS  2,352,333

RECORDING CLINICAL THERMOMETER

Filed Aug. 26, 1941

Inventor
WILLIAM R. LUKENS

Patented June 27, 1944

2,352,333

UNITED STATES PATENT OFFICE 2,352,333

RECORDING CLINICAL THERMOMETER

William R. Lukens, Hillsboro, Ohio

Application August 26, 1941, Serial No. 408,360

3 Claims. (Cl. 73—368)

My invention relates to measuring instruments of the recording type and in particular to self-contained, portable recording instruments.

In the diagnosis and subsequent treatment of several ailments of humans and animals the information derived from a fever or temperature chart is of great value. In many cases, however, a reliable temperature chart is obtainable only by hospitalization or constant attendance by the physician, veterinarian or other skilled observer. Since none of these courses is always available, a device which would produce a temperature chart automatically, would render invaluable aid in many instances. A well known illness which is characterized by an erratic fever in the patient is undulant fever. This ailment is readily diagnosed from the characteristic undulating temperature line of the fever chart.

Furthermore, once a treatment has been prescribed, the effectiveness thereof may be estimated by reference to the temperature chart of the patient.

In testing machinery it is often desirous to know exactly what temperature conditions exist in certain parts of the machine during the test. The use of a compact, self-contained, portable recording thermometer, particularly adapted to be secured to any available part of the machine under test, greatly assists in acquiring this data. Data thus acquired are continuous, free from observers' errors, permanent, and readily oriented with relative data.

Most recording devices are less sensitive than indicating instruments of the same range, because of the friction of the inscribing means on the chart or record sheet. This fault of recording devices is obviated by the use of my novel scribing means.

It is, accordingly, an object of this invention to provide a compact, self-contained, recording thermometer for any clinical or general use, where a continuous record of temperature is desired.

It is an object of the invention to provide for maintaining this thermometer in thermal relation with any subject under observation, whether it be a machine, or an animal or human body.

It is an object to enclose all working parts of the device, while positioning a thermal responsive element of a thermometer exteriorly of the device, for establishing direct thermal contact with a test subject.

It is a further object to insulate this thermal responsive element from thermal influences in the heat conducting portions of the instrument.

It is a still further object of the invention to shape one or more exterior walls of the instrument to conform to the body under observation.

Further objects and advantages will appear in the following detailed description.

Referring to the drawing.

Figure 3:
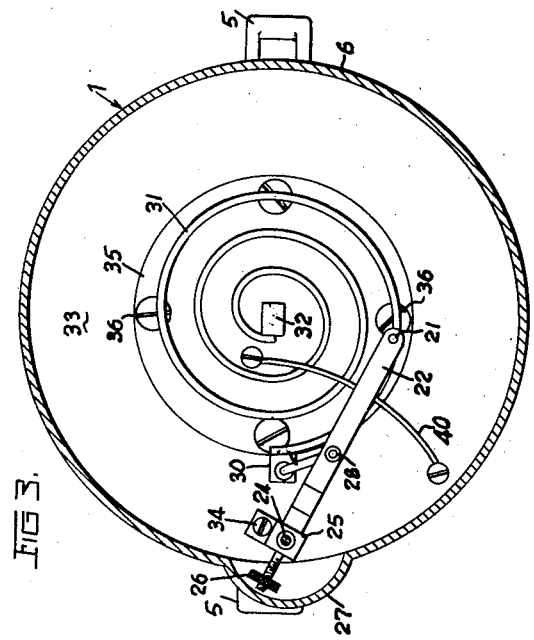
Figure 3 is a section on the line 3—3 of Figure 1, looking in the direction of the arrow.
Figure 1:
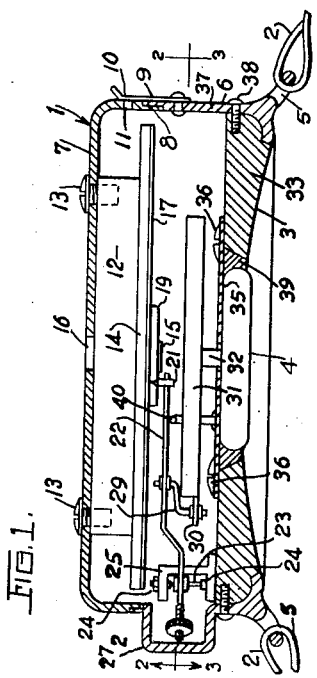
Figure 1 is a vertical section through one form of my invention.
Figure 2:
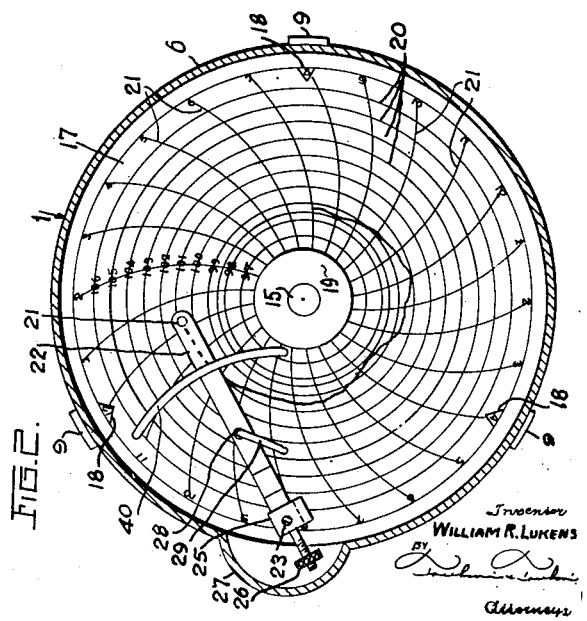
Figure 2 is a section on the line 2—2 of Figure 1, looking in the direction of the arrow.

Referring now to the drawing in detail and in particular to Figures 1, 2 and 3, my invention is seen to consist of a cylindrical enclosure generally designated 1 adapted to be fastened to, say, the body of a patient, by means of straps 2 in such a manner that the concave under surface 3 of the instrument is firmly held against the patient. By this means the stimulus responsive element 4, in this case a thermo-responsive element, is subjected to the influence of the body temperature of the patient and through associated mechanism (hereinafter described) inscribes a continuous record upon a moving chart.

The straps 2 are fastened to the case 1 by means of loops 5 integral with the lower portion 6 of the case. Lower portion 6 and upper portion 7 of the case 1 are telescoped as at 8 and are thereby maintained in axial alignment. Angular alignment between 6 and 7 is maintained through spring clips 9, pins 10 and holes 11. Portions 6 and 7 may be of any suitable material and while they are shown here as being made of sheet metal, it is understood that other materials, such as Bakelite or other plastics, are equally adaptable.

Mounted on the inner surface of the upper portions or lid 7, is a clockworks 12. Clockworks 12 is held in place by screw 13 and is provided with a circular plate or turntable 14, said turntable being integral with, or affixed to the output shaft 15 of the clockworks. The clockworks is adapted to be wound by a key inserted thru aperture 16 of the lid 7.

Turntable 14 is provided as a means to support and rotate a circular chart 17. Chart 17 is affixed to and aligned with the turntable in any suitable manner. For instance, in Figures 1 and 2 the affixing and aligning means may be clips 18 and nut 19, the latter being screw threadedly engaged by shaft 15 to clamp the chart at the center, and the former being integral with the turntable to support the periphery of the chart and provide fixed points whereby the chart may be aligned with the turntable.

As seen in Figure 2, chart 17 is subdivided by a series of concentric circles 20 and curved lines 21. The curved lines are substantially radial and divide the chart circumferentially into divisions representing any standard unit of time. As shown in Figure 2 the chart may be divided into twenty four spaces, each representing one hour and thereby providing a chart for a complete day. The concentric lines 20 divide the chart radially into spaces, each of which represents an increment of the quantity being measured. In this case the measured quantity is temperature and the divisions are degrees Fahrenheit.

Within the lower portion 6 of case 1 is arranged a scribing means comprising a pen or pencil 21, mounted at the outer end of an arm 22 which is pivoted by means of a staff 23 in bearings 24. Bearings 24 may be jewelled and are adjustably mounted in a block 25 which is fastened to block 33 by a screw 34.

Scribing arm 22 is counterbalanced by a nut 26 screw threadedly attached to arm 22 on the projection thereof beyond the staff 23. Portion 6 is enlarged as at 27 to accommodate the swing of nut 26 and arm 22 as the instrument responds to an external stimulus. The effect of counterbalance 26 is to balance the movement in all positions.

Arm 22 is apertured at 28 to receive one end of a link 29 the other end of which is fastened by means of plate 30 to one end of a spiral tube 31.

The tube 31 is of the well known Bourdon coil construction and is pressure responsive. The inner end of tube 31 is anchored to the rigid post 32, said post being bored (not shown) to provide a passage from the tube to a thermal-responsive liquid well 4 which is rigidly attached to the lower end of the post. The assembly of well 4, post 32, and coil 31, is secured to block 33 by means of plate 35 and screws 36.

Block 33 is secured to the annular metal portion 37 of 6 by screws 38, and is preferably of a material having good heat insulating properties. The effect of the insulating material surrounding liquid well 4 may be enhanced by the addition of another insulating layer as shown at 39.

In operation the pressure within the tube 31 is directly dependent upon the temperature of liquid well 4 which in turn is dependent upon the temperature of the patient's body. In response to changes in pressure the free end of coil 31 swings to actuate link 29 which in turn moves arm 22. This causes scribing point 21 to describe a line on chart 17 and a continuous record is thereby obtained.

Point 21 is urged into and maintained in engagement with the chart by means of a bar 40 as seen in Figures 1, 2 and 3.

It is apparent that my invention is not limited in use to a clinical device employed by physicians, but may be used in many other situations requiring a portable recording thermometer.

It is also apparent that other thermal responsive devices might be employed to activate the scriber without departing from the spirit of my invention. The scribing arm could be operated by a bimetal strip, for example, or a Sylphon or diaphragm in combination with a liquid well.

Further, it is apparent that the novel scribing means herein described need not be limited in use to a portable thermometer but would be equally useful in any recording instrument, whether portable or fixed, and responsive to any stimulus. For example a clinical thermometer might be so constructed that its thermal responsive element connected to a patient's body would operate an indicating recorder located at some remote station. A device of this type, in a hospital, would enable a central observer to gather data from many points.

I do not wish to be limited to the details of construction and arrangement herein shown and described, and any changes or modification may be made therein within the scope of the claims.

Having thus fully described my invention, what I claim as new and desire to secure by Letters Patent is:

1. A self-contained temperature recording instrument comprising a housing formed of two telescoping portions, a temperature responsive device mounted on one of said portions, recording mechanism including a record chart and a scribing device, said record chart being contained within the other of said portions, and means extending between said temperature responsive device and said scribing device for causing movement of said temperature responsive device to be recorded on said record chart.

2. A self-contained temperature recording instrument comprising a housing completely enclosed except for an opening, a temperature responsive device mounted on said housing adjacent said opening, a recording mechanism including a record chart and a scribing device within the housing, means for causing the movements of said temperature responsive device to be recorded on said record chart, said housing being formed of two telescoping portions, said temperature responsive device being mounted on one of said housing portions and said record chart being contained within the other of said housing portions.

3. A self-contained temperature recording instrument comprising a housing formed of two telescoping portions and being completely enclosed except for an opening in the bottom portion thereof, a temperature responsive device mounted in said opening and forming a substantial continuation of the lower surface of the bottom of said housing, insulating material surrounding said device in said opening and located between the bottom portion of the housing and said device, a recording mechanism including a scribing device, a record chart and means for rotating the chart, said record chart and said rotating means being positioned in the upper portion of said housing, and connecting mechanism between said temperature responsive device and said scribing device for effecting movements of the latter in response to variations in temperature for recording the variations on said record chart.

WILLIAM R. LUKENS.